United States Patent
González Gozalbo et al.

(10) Patent No.: US 10,981,642 B2
(45) Date of Patent: Apr. 20, 2021

(54) MODULAR LIFTING SURFACE

(71) Applicant: AIRBUS OPERATIONS S.L., Madrid (ES)

(72) Inventors: Alfonso González Gozalbo, Madrid (ES); Eugenio Piñeyroa De La Fuente, Madrid (ES)

(73) Assignee: AIRBUS OPERATIONS S.L., Madrid (ES)

( * ) Notice: Subject to any disclaimer, the term of this patent is extended or adjusted under 35 U.S.C. 154(b) by 320 days.

(21) Appl. No.: 16/021,568

(22) Filed: Jun. 28, 2018

(65) Prior Publication Data
US 2019/0002082 A1 Jan. 3, 2019

(30) Foreign Application Priority Data
Jun. 28, 2017 (EP) .................... 17382409

(51) Int. Cl.
*B64C 3/38* (2006.01)
*B64C 3/48* (2006.01)
*B64C 3/50* (2006.01)
*B64C 5/02* (2006.01)
*B64C 3/18* (2006.01)
*B64C 3/28* (2006.01)
*B64C 3/26* (2006.01)

(52) U.S. Cl.
CPC ............... *B64C 3/48* (2013.01); *B64C 3/18* (2013.01); *B64C 3/26* (2013.01); *B64C 3/28* (2013.01); *B64C 3/50* (2013.01); *B64C 5/02* (2013.01); *B64C 2211/00* (2013.01)

(58) Field of Classification Search
None
See application file for complete search history.

(56) References Cited

U.S. PATENT DOCUMENTS

| | | | | |
|---|---|---|---|---|
| 7,828,246 B2 * | 11/2010 | Ashton | .................... | B64C 3/24 244/124 |
| 2005/0236524 A1 | 10/2005 | Sarh | | |
| 2013/0320142 A1 * | 12/2013 | Nordman | .......... | B29C 66/73756 244/123.5 |
| 2014/0138485 A1 * | 5/2014 | Sanderson | ................ | B64C 3/20 244/123.1 |
| 2016/0176499 A1 * | 6/2016 | Evans | ....................... | B64C 3/18 244/123.1 |
| 2016/0244143 A1 * | 8/2016 | Foster | ....................... | B64F 5/10 |

FOREIGN PATENT DOCUMENTS

| | | |
|---|---|---|
| DE | 12 41 269 | 5/1967 |
| EP | 3 000 719 | 3/2016 |
| FR | 694 343 | 12/1930 |
| WO | 2008/103735 | 8/2008 |

OTHER PUBLICATIONS

Extended Search Report for EP17382409.5, dated Dec. 12, 2017, 9 pages.

* cited by examiner

*Primary Examiner* — Richard G Davis
(74) *Attorney, Agent, or Firm* — Nixon & Vanderhye P.C.

(57) ABSTRACT

A method for manufacturing a modular lifting surface from a standard lifting surface, the modular lifting surface includes a central support structure including an upper skin, a lower skin and at least a first spar. The method includes providing the upper skin and the lower skin which are suitable for any of various sizes of a modular lifting surface for the standard lifting surface, wherein the upper skin and lower skin correspond to a standard upper skin and the lower skin conforms to a standard lower skin.

14 Claims, 11 Drawing Sheets

MODULAR LIFTING SURFACE

RELATED APPLICATION

This application claims priority to European Patent Application EP17382409.5 filed Jun. 28, 2017, the entirety of which is incorporated by reference.

TECHNICAL FIELD

The present invention belongs to the field of aircraft structures and, more particularly, to the field of lifting surface and their manufacture. The present invention is directed to a method for manufacturing a modular lifting surface from a standard lifting surface.

BACKGROUND OF THE INVENTION

Conventional manufacturing techniques for aircraft generally require that structural parts for each type and size of an aircraft be made to a specific size specific. Specific tools are needed unique to the manufacture and assembly of each particular structure and for each type and/or size of aircraft. For example, wing skin molds, such as clam-shell molds, are used to form skins, such as upper and lower skins, of lifting surfaces. These molds shape the composite layers that form the skin while resins infused into the layers are cured.

Additionally, each one of these type aircraft is designated to meet and guarantee specific mission and performance requirements.

From an economical and manufacturing standpoint, it would be desirable to build components or structures of an aircraft with a high degree of commonality. That is, the different types and size of an aircraft share fuselage sections, cockpit, wing, empennage, etc.

Nowadays, the time for manufacturing and assembly of aircraft components tends to be high because, in part, of the use of specific tools unique to each component in each type or size of aircraft. The high manufacturing times increases the cost to manufacture the aircraft components.

By way of example, a family of aircraft tends to include aircraft with different sizes. However, a common empennage (vertical tail plane VTP and horizontal tail plane HTP) is used for the family. The empennage is generally sized to satisfy critical requirements of the shortest aircraft of the family. Because it is suited for the shortest aircraft, the common empennage is larger and heavier than needed for the middle-sized aircraft in the family and for stretched (longer fuselage) aircraft in the family. Thus, the middle sized and longer family members have an oversized empennage with the corresponding weight and drag penalty.

SUMMARY OF THE INVENTION

The present invention may be embodied as methods for manufacturing aircraft components with parts having dimensions common for all similar parts in members of an aircraft family. In particular, has been studied and demonstrated that said improvement is provided by a modular lifting surface for any member of an aircraft family sharing among them some dimensions.

The present invention may be embodied to provide a method of manufacturing a lifting surface from a standard lifting surface keeping the upper and lower surfaces, and modifying or keeping the height of the standard spar of the standard central support structure of the standard lifting surface. Therefore, a modular lifting surface is obtained mainly, among other, by vertically moving or keeping the standard upper and lower surfaces by respectively increasing or keeping the height of the standard spars of the standard central support structure of the standard lifting surface.

A "modular" lifting surface is a lifting surface which comprises different components, some of those components having dimensions in common with the same components of lifting surfaces of different sizes, wherein said dimensions in common are provided from a standard lifting surface.

The term "standard" means the same lengths of any component of a modular lifting surface for any size of modular lifting surface. Thus, a modular lifting surface will be manufactured from a standard lifting surface which has already defined, for example the chord lengths of skins of the central structure of any modular lifting surface will be constant relative to the standard lifting surface according to a cross section of any lifting surface.

An aircraft principal axes are the longitudinal axis (or roll axis), the lateral axis (or pitch axis) and the normal axis (or yaw axis). A vertical plane is defined by the longitudinal and normal axes. A lateral plane is defined by the longitudinal and lateral axes.

A "chord length" is a length along a longitudinal direction X-X' that is parallel to the longitudinal axis of an aircraft. A "span length" is a length in a lateral direction that is parallel to the lateral axis of an aircraft and perpendicular to the longitudinal direction X-X'. A cross section of a lifting surface is taken in a transversal plane which is substantially parallel to the vertical plane or to the lateral plane of an aircraft respectively.

The invention may be embodied as a method for manufacturing a modular lifting surface from a standard lifting surface, the modular lifting surface comprising a central support structure, the central support structure having an upper and lower skins and at least a first spar, the method comprising the following steps:

(a) providing an upper and lower skin suitable for any size modular lifting surface to be manufactured, wherein the upper and lower skins correspond to an upper and lower standard skin of the standard lifting surface respectively, so that according to a cross section (A-A, B-B, C-C) of any lifting surface, the upper and lower skin of the modular lifting surface have a chord length which corresponds to a standard chord length D of the upper and lower standard skins of the standard lifting surface, (b) providing at least a first spar from a first standard spar of the standard lifting surface modifying or keeping a standard height $H'_1$ of said first standard spar, (c) assembling the first spar to both upper and lower skins respectively for obtaining the central support structure, so that the first spar is located between said skins defining a first end of the central support structure, (d) providing a leading edge and a trailing edge, (e) assembling the leading edge to the central support structure where the first spar is assembled to the central support structure, and assembling the trailing edge to the central support structure on a second end of the central support structure, the second end being opposite to the first end where the first spar is located, and (f) obtaining a modular lifting surface.

The above described method may be used as an improved, versatile and modular method of manufacturing lifting surfaces of an aircraft.

The use of standard chord lengths for skins of a central support structure allows for common tooling and assembly jigs to make standard components of a central structure. The use of standard components, such as upper and lower standard surfaces, allows for the manufacture lifting surfaces of various sizes by modifying the height of the standard spars of a standard lifting surface.

Also, standard chord lengths of skins and other standard structural components of a lifting surface for a family of aircraft may be used to reduce the variations in tooling and assembly jigs needed to make the lifting surfaces.

Reducing the variations in tooling and assembly jigs needed to make aircraft in a family of aircraft, the present invention may be employed to reduce the cost and time needed to manufacture aircraft.

Additionally, the use of standard chord lengths of skins implies that the distance between the ends of the central structure is also standard because it is corresponded to said skins chord lengths.

Furthermore, the invention may embodied to reduce the demand for designs of particular lifting surfaces. Simple geometry changes are provided for a particular lifting surface. Thus, simple geometry changes imply a high impact on implementation and manufacturing costs, thanks to the manufacturing of standard components of a lifting surface for any size of lifting surfaces.

The at least first spar is provided from a first standard spar of the standard lifting surface modifying or keeping a standard height $H'_1$ of said first standard spar according to a cross section of any lifting surface, and/or modifying or keeping a standard height $H'_1$ of said first standard spar along the span length of any lifting surface.

The invention may be embodied as a modular lifting surface is a fin.

The invention may be embodied as a method further comprises the following steps:

(a) providing a second spar from a second standard spar of the standard lifting surface modifying or keeping a standard height $H'_2$ of said second standard spar, and (b) assembling the second spar to both upper and lower skins respectively, so that the second spar is located between said skins in the second end of the central support structure (1).

In a more particular embodiment, the central support structure is a torsion box, wherein the torsion box comprises a first and second spar and an upper and lower skin.

In a more particular embodiment, the modular lifting surface is a horizontal tail plane or a vertical tail plane of an aircraft. In another particular embodiment, the modular lifting surface is an aircraft wing.

Furthermore, the central support structure has a first skin (upper skin) and a second skin (lower skin), wherein "upper" and "lower" will be understood as to where the skins are facing according to an aircraft. For example, if the modular lifting surface is a horizontal tail plain or a wing, the expression upper will be understood as the skin which is observed from a top view of the aircraft, and the expression lower will be understood as the skin which is observed from a bottom view of the aircraft. However, if the modular lifting surface is a fin, the expressions upper and lower will be both understood as the skins which are observed from a lateral view of the aircraft.

In a particular embodiment, the trailing edge comprises a control surface suitable for any size of modular lifting surface to be manufactured, the control surface being assembled to the central support structure in the second end of said central support structure.

In a particular embodiment, the trailing edge comprises a trailing edge structure and a control surface, the control surface being suitable for any size of modular lifting surface to be manufactured, the trailing edge structure being assembled to the central support structure in the second end of said central support structure, and the control surface being assembled to the trailing edge structure.

The control surface may be a component or a mechanism on an aircraft's lifting surface that increases the amount of lift produced by such lifting surface. The control surface may be a fixed component, or a moveable mechanism. The control surface may be a flap comprising a hinge line.

Furthermore, the trailing edge structure is part of the trailing edge which is structurally rigid and comprises a plurality of ribs. The control surface part of the trailing edge which is structurally movable.

In a more particular embodiment, the control surface, according to a transversal section of the modular lifting surface, comprises a chord length and a standard hinge line which is suitable for any size of lifting surfaces. According to a transversal section of the modular lifting surface the same chord length of a control surface is provided for any size of lifting surfaces, any such lifting surfaces shares the same hinge line.

Advantageously, providing a standard control surface with chord lengths and a hinge line suitable for any size of modular lifting surfaces, a single control surface (in particular its lower and upper covers) can be manufactured for any size of modular lifting surfaces.

In a particular embodiment, according to a cross section B-B of any lifting surface the trailing edge is provided with a chord length $C_{TE}$ equal to a standard chord length $C'_{TE}$ of a trailing edge of the standard lifting surface.

The fact that a standard lifting surface is previously defined, advantageously facilitates the dimensioning and manufacturing of a modular lifting surface, and also reduces the tooling and assembly jigs for such modular lifting surface.

In a particular embodiment, according to a cross section A-A of any lifting surface the trailing edge is provided with a chord length $C_{TE}$ greater than a standard chord length $C'_{TE}$ of a trailing edge of the standard lifting surface.

In a particular embodiment, according to a cross section of any lifting surface the trailing edge is provided with a chord length $C_{TE}$ smaller than a standard chord length $C'_{TE}$ of a trailing edge of the standard lifting surface.

In a particular embodiment, according to a cross section of any lifting surface the first spar is provided with a height $H_1$ equal to the standard height $H'_1$ of the standard first spar of the standard lifting surface.

In a particular embodiment, according to the cross section C-C the first spar is provided with a height $H_1$ smaller to the standard height $H'_1$ of the standard first spar of the standard lifting surface.

In a particular embodiment, according to the cross section A-A the first spar is provided with a height $H_1$ greater to the standard height $H'_1$ of the standard first spar of the standard lifting surface.

In a particular embodiment, according to the cross section C-C the leading edge is provided with a chord length $C_{LE}$ smaller than a chord length $C'_{LE}$ of the leading edge of the standard lifting surface.

In a particular embodiment, according to the cross section A-A the leading edge is provided with a chord length $C_{LE}$ greater than a chord length $C'_{LE}$ of the leading edge of the standard lifting surface.

In a particular embodiment, according to a cross section the second spar is provided with a height $H_2$ equal to the standard height $H'_2$ of the standard second spar of the standard lifting surface.

In another particular embodiment, according to a cross section the second spar is provided with a height $H_2$ smaller to the standard height $H'_2$ of the standard second spar of the standard lifting surface.

In another particular embodiment, according to a cross section the second spar is provided with a height $H_2$ greater to the standard height $H'_2$ of the standard second spar of the standard lifting surface.

In a particular embodiment, according to a cross section the modular lifting surface obtained comprises a total chord length C greater than the total standard chord length C' of the standard lifting surface.

In another particular embodiment, according to a cross section the modular lifting surface obtained comprises a total chord length C smaller than the total standard chord length C' of the standard lifting surface.

In a particular embodiment, the modular lifting surface has a span length S equal to a standard span length S' of the standard lifting surface.

In another particular embodiment, the modular lifting surface has a span length S greater than a standard span length S' of the standard lifting surface.

In another particular embodiment, the modular lifting surface has a span length S smaller than a standard span length S' of the standard lifting surface.

In a second inventive aspect, the invention provides an aircraft comprising a modular lifting surface according to the first inventive aspect.

All the features described in this specification (including the claims, description and drawings) and/or all the steps of the described method can be combined in any combination, with the exception of combinations of such mutually exclusive features and/or steps.

The invention may be embodied as a method to standardize tooling for forming skins for modular lifting surfaces for a family of aircraft including a first aircraft having a first length from nose to tail and a second aircraft having a second length, longer than the first, the method includes:

(a) determining whether a modular lifting structure to be formed is for the first aircraft or the second aircraft;

(b) forming a pair of skins for the modular lifting structure from standardized tooling for each of the first and second aircraft;

(c) selecting a front spar having a first maximum height if the modular lifting structure is for the first aircraft and selecting a front spar having a second maximum height different from the front spar for the first aircraft;

(d) attaching a front spar to front edges region of the skins such that the front spar forms a front region of a central support structure and the skins form outer surfaces of the central support structure, (e) attaching a rear spar to rear edge regions of the skins such that the rear spar forms a rear of the central support structure;

(f) attaching a leading edge structure to the front of the central support structure, and (g) attaching a trailing edge structure to the rear of the central support structure, wherein the front spar and rear spar are positioned at locations in the modular lifting surface which are common to all front and rear spars for all modular lifting structures for the family of aircraft.

Further, the central support surface may have a chord length which is the same as a corresponding chord length for all of the central support structures for the family of aircraft. Also, the trailing edge may include a trailing edge structure having a front attached to the rear of the central support structure and a rear section attached along a hinge line to a movable control surface, wherein the hinge line is at a position on the modular lifting surface common to positions for all of the modular lifting surfaces in the family of aircraft.

The invention may be embodied as a method using standardized tooling to form skins and to assemble modular lifting structures for a family of aircraft including a first aircraft having a first length from nose to tail and a second aircraft having a second length, longer than the first, the method includes:

(a) determining whether a modular lifting structure to be formed is for the first aircraft or the second aircraft;

(b) forming skins for a control surface of the modular lifting structure from standardized tooling useable to form skins for each of the first and second aircraft;

(c) forming a control structure by arranging the skins on opposite sides of the control structure such that the skins form outer surfaces of the control surface, wherein vertical distances between skins of the control structure are greater for a control structure formed for the first aircraft than for a control surface formed for the second aircraft;

(d) forming a central support structure for the modular lifting structure, (e) attaching a leading edge structure to a front of the central support structure;

(f) attaching a trailing edge structure to a rear of the central support structure; and (g) attaching the control structure to a rear of the trailing edge structure.

The method may include attaching of the control structure includes attaching the control structure along a hinge line between the trailing edge structure and the control structure, wherein the hinge line is at a location in the modular lifting structure which is at a common location for all hinge lines in the modular lifting structures of the family of aircraft.

A gap between the skins and at a trailing edge of the control structure may be greater if the control structure is formed for the first aircraft and if formed for the second aircraft.

The central support surface has a chord length which is the same as a corresponding chord length for all of the central support structures for the family of aircraft.

The standardized tooling may include molds and the step of forming includes molding the pair of skins in the molds from layers of composite material and resin. The molding may include curing the layers and resin in the molding.

The invention may be embodied as a method using standardized tooling to form skins and to assemble modular lifting structures for a family of aircraft including a first aircraft having a first length from nose to tail and a second aircraft having a second length, longer than the first, the method includes:

(a) determining whether a modular lifting structure to be formed is for the first aircraft or the second aircraft;

(b) forming a pair of skins for a control surface of the modular lifting structure from standardized tooling useable to form skins for each of the first and second aircraft;

(c) forming a control structure by arranging the pair of skins on opposite sides of the control structure such that the skins form outer surfaces of the control surface, wherein an angle formed by the skins with an apex at a trailing edge of the control structure is greater if the control structure is formed for the first aircraft than if formed for the second aircraft;

(d) forming a central support structure for the modular lifting structure, (e) attaching a leading edge structure to a front of the central support structure;

(f) attaching a trailing edge structure to a rear of the central support structure; and (g) attaching the control structure to a rear of the trailing edge structure.

The invention may be embodied as a method to assemble a modular lifting structure for an aircraft in a family of aircraft including a first aircraft having a first length from nose to tail and a second aircraft having a second length, longer than the first, the method includes:

(a) determining whether a modular lifting structure to be formed is for the first aircraft or the second aircraft;

(b) forming skins for a control surface of the modular lifting structure wherein the skins have dimensions corresponding to standardized dimensions for skins of corresponding control surfaces on all aircraft in the family of aircraft;

(c) forming a control structure by arranging the skins on opposite sides of the control structure such that the skins form outer surfaces of the control surface, wherein vertical distances between skins of the control structure are greater for a control structure formed for the first aircraft than for a control surface formed for the second aircraft;

(d) forming a central support structure for the modular lifting structure, (e) attaching a leading edge structure to a front of the central support structure;

(f) attaching a trailing edge structure to a rear of the central support structure; and (g) attaching the control structure to a rear of the trailing edge structure.

The step of attaching of the control structure may include attaching the control structure along a hinge line between the trailing edge structure and the control structure, wherein the hinge line is at a location in the modular lifting structure which is at a common location for all hinge lines in the modular lifting structures of the family of aircraft.

The step of forming the skins for the control surface of the modular lifting structure may be performed using standardized tooling useable to form skins for control surfaces in each of the aircraft of the family.

A gap between the skins and at a trailing edge of the control structure may be greater if the control structure is formed for the first aircraft than if formed for the second aircraft.

The central support surface may have a chord length which is the same as a corresponding chord length for all of the central support structures for the family of aircraft.

The step of forming the skins may include molding the skins in standardized molds which may be used to form skins for any of the aircraft in the family, and the step of forming includes molding the pair of skins in the standardized molds from layers of composite material and resin. The step of molding includes curing the layers and resin in the molding.

The standardized dimensions may allow the skins to be used on any of the aircraft in the family of aircraft.

The invention may be embodied as a method to assemble a modular lifting structure for an aircraft in a family of aircraft including a first aircraft having a first length from nose to tail and a second aircraft having a second length, longer than the first, the method includes:

(a) determining whether a modular lifting structure to be formed is for the first aircraft or the second aircraft;

(b) forming skins for a control surface of the modular lifting structure wherein the skins have dimensions corresponding to standardized dimensions for skins of corresponding control surfaces on all aircraft in the family of aircraft;

(c) forming a control structure by arranging the skins on opposite sides of the control structure such that the skins form outer surfaces of the control surface, wherein an angle defined by the skins is greater if the control structure is formed for the first aircraft than if formed for the second aircraft;

(d) forming a central support structure for the modular lifting structure, (e) attaching a leading edge structure to a front of the central support structure;

(f) attaching a trailing edge structure to a rear of the central support structure; and (g) attaching the control structure to a rear of the trailing edge structure.

The angle defined by the skins may have an apex at a trailing edge of the control structure and the angle may be aligned along a chord of the control structure.

The step of attaching of the control structure may include attaching the control structure along a hinge line between the trailing edge structure and the control structure, wherein the hinge line is at a location in the modular lifting structure which is at a common location for all hinge lines in the modular lifting structures of the family of aircraft.

The central support structure may have a chord length which is the same as a corresponding chord length for all of the central support structures for the family of aircraft.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE INVENTION

Figure 1A:
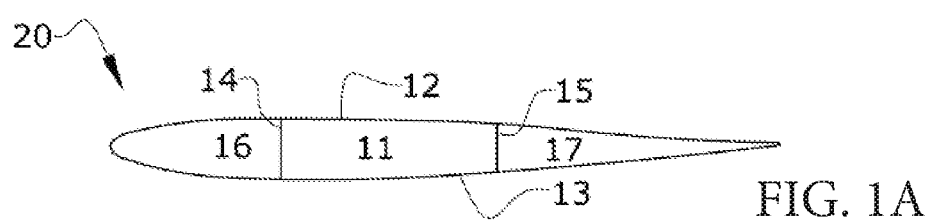
FIGS. 1A to 1E show schematic views of the present method according to an embodiment of the present invention.
Figure 1B:
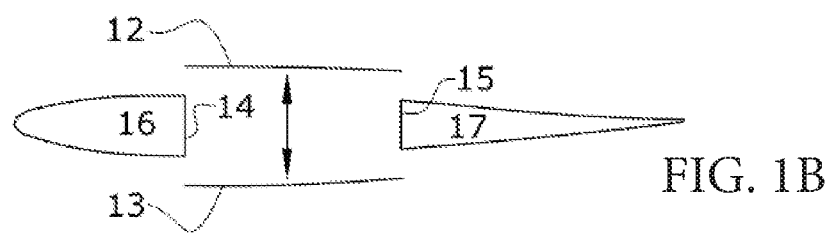
Figure 1C:
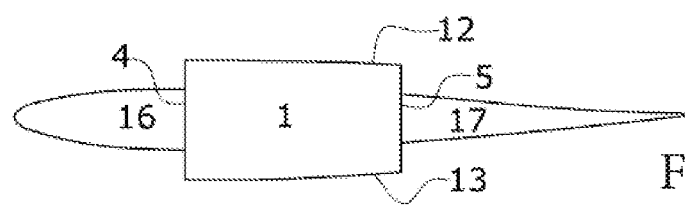
Figure 1D:
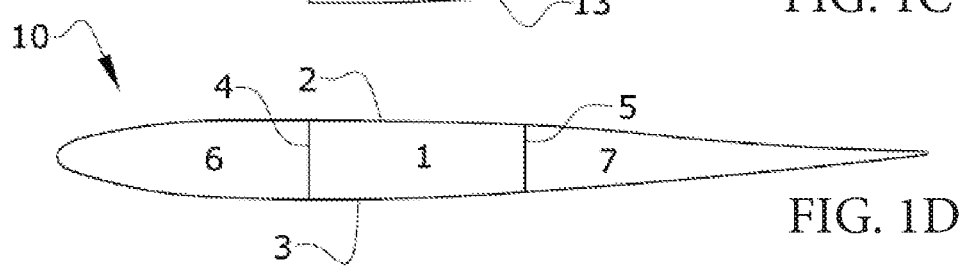
Figure 1E:
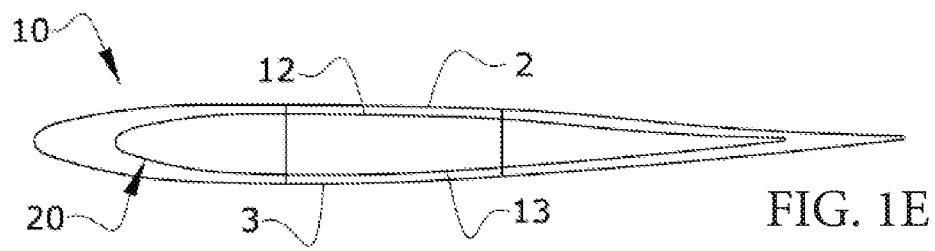

FIGS. 1A to 1E show schematic diagrams summarizing the present method according to cross sectional views of a horizontal tail plain. Starting from above, it is shown a cross view of a standard lifting surface (20) comprising a standard central support structure (11) which in this particular example is a torsion box, a standard leading edge (16) and a standard trailing edge (17). In addition, the standard central structure (11) comprises a first (14) and a second (15) standard spars and a first (12) and second (13) standard skins. In a particular example, the first (14) and second (15) standard spars will be understood as a front and rear standard spars respectively according to the flight direction of the aircraft. Additionally, the first (12) and second (14) standard skins will be understood as an upper and lower skin according to the flight direction of the aircraft.

Furthermore, FIGS. 1A to 1E show from up to down how the first standard skin (12) is vertically moved upwards and the second standard skin (13) are vertically moved downwards in such a way that a new central support structure (1), e.g., a torsion box, is formed, in this particular example, increasing the height of the standards spars (14, 15) to obtain a first (4) and second (5) spar of the central support structure (1). Then, a new leading edge (6) is assembled to the central support structure (1) and a new trailing edge (7) is also assembled to said central support structure (1) so that a modular lifting surface (10) is obtained.

As shown, the method of manufacturing the lifting surface starts from a standard lifting surface and keeps the upper and lower surfaces, and modifies or keeps the height of the standard spar of the standard central support structure of the standard lifting surface. Thus, in general terms, a modular lifting surface is obtained mainly, among other, by vertically moving or keeping the standard upper and lower surfaces, and by respectively increasing/decreasing or keeping the height of the standard spars of the standard central support structure of the standard lifting surface.

The standard lifting surfaces are standardized for a family of aircraft. An example of a family of aircraft is the Airbus 330 Family which currently includes the A330-200, A330-300, A330-800neo and A330-900neo. The A330-200 has a length of 58.8 m (193 ft), and the A330-900neo has a length of 63.7 m (209 ft). Because of these and other differences between the family members in an aircraft family, the lifting structures differ between the family members.

Standardizing at least some of the lifting surfaces, e.g., skin dimensions, across all aircraft in a family (or at least a subset of family members) allows for standardized tooling to be used to form the lifting surfaces. The standardized tooling may be molds uses to form the lifting surfaces. Molding lifting surfaces from composite materials, such as composite layers impregnated with a resin, is a conventional approach to forming lifting surfaces. The molds cause the composite layers to conform to the desired shape of a lifting surface. The molds may be a clam-shaped mold in which the composite material layers and resin are sandwiched between mold sections while the resin cures and the lifting surface is formed.

Standardizing the molds used to form a lifting surface reduces the manufacturing cost and complexity of forming lifting surfaces for a family of aircraft. The standardized molds may be used to form upper and lower lifting surfaces, e.g., signs, on a central support structure, e.g., torsion box, for a horizontal tail plane, and for the upper and lower skin surfaces on control structures, e.g., elevators, attached to a trailing edge of a horizontal tail plane.

Figure 2:
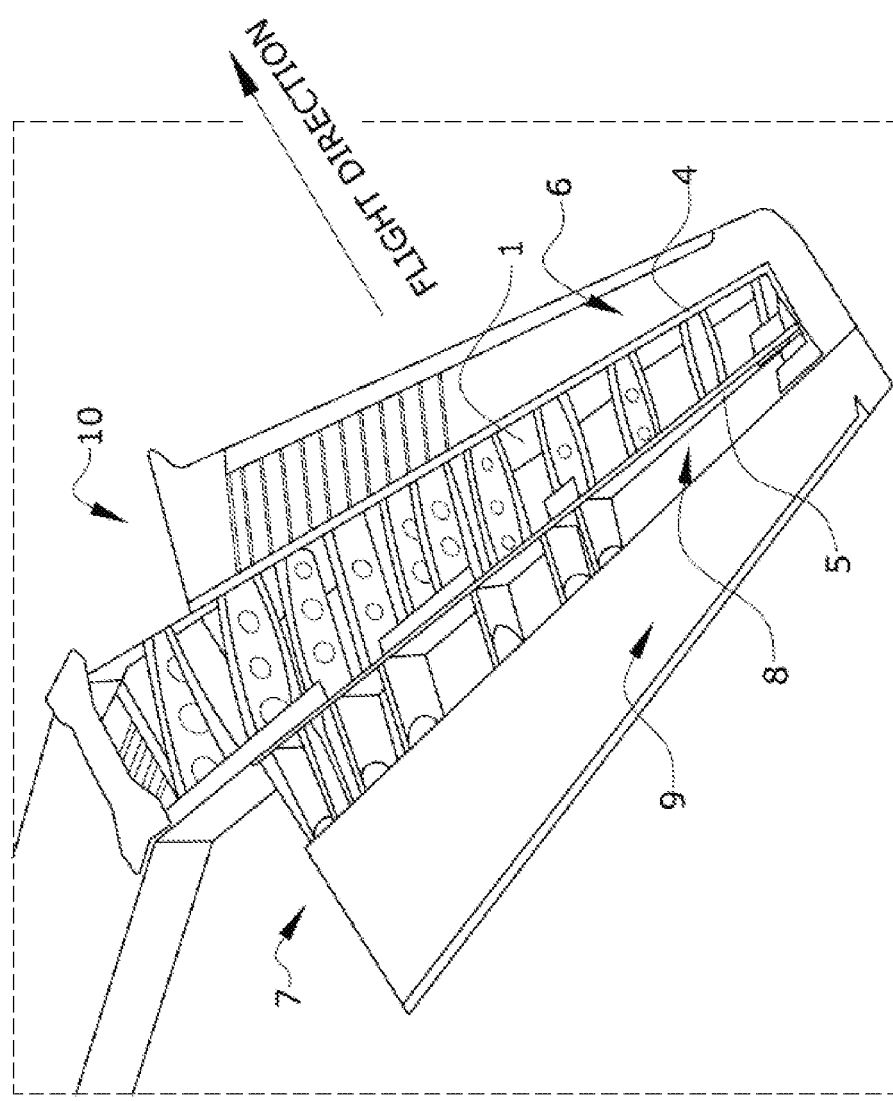
FIG. 2 shows a perspective view of a modular lifting surface according to an embodiment of the present invention.

FIG. 2 shows a horizontal tail plane (10) comprising a torsion box (1) mainly formed by a front (4) and rear (5) spar, an upper (2) and lower (3) skins (which are not shown), and a plurality of ribs. The horizontal tail plane (10) further comprises a leading edge (6) and a trailing edge (7), wherein the trailing edge (7) comprises a trailing edge structure (8) formed by a plurality of structural elements i.e. ribs; and a control surface (9).

Figure 3:
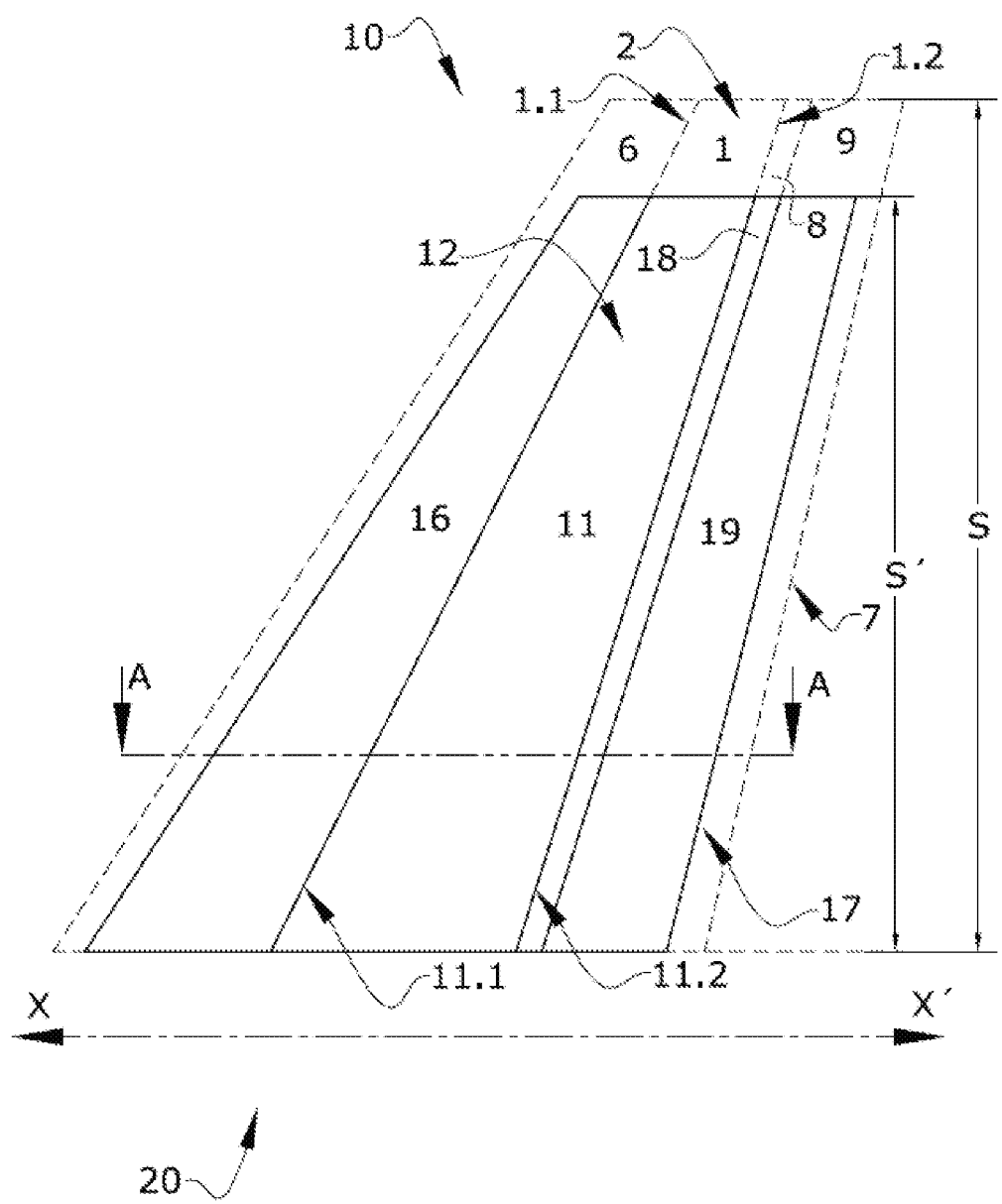
FIG. 3 shows a schematic top view of a modular lifting surface according to an embodiment of the present invention.
Figure 4:
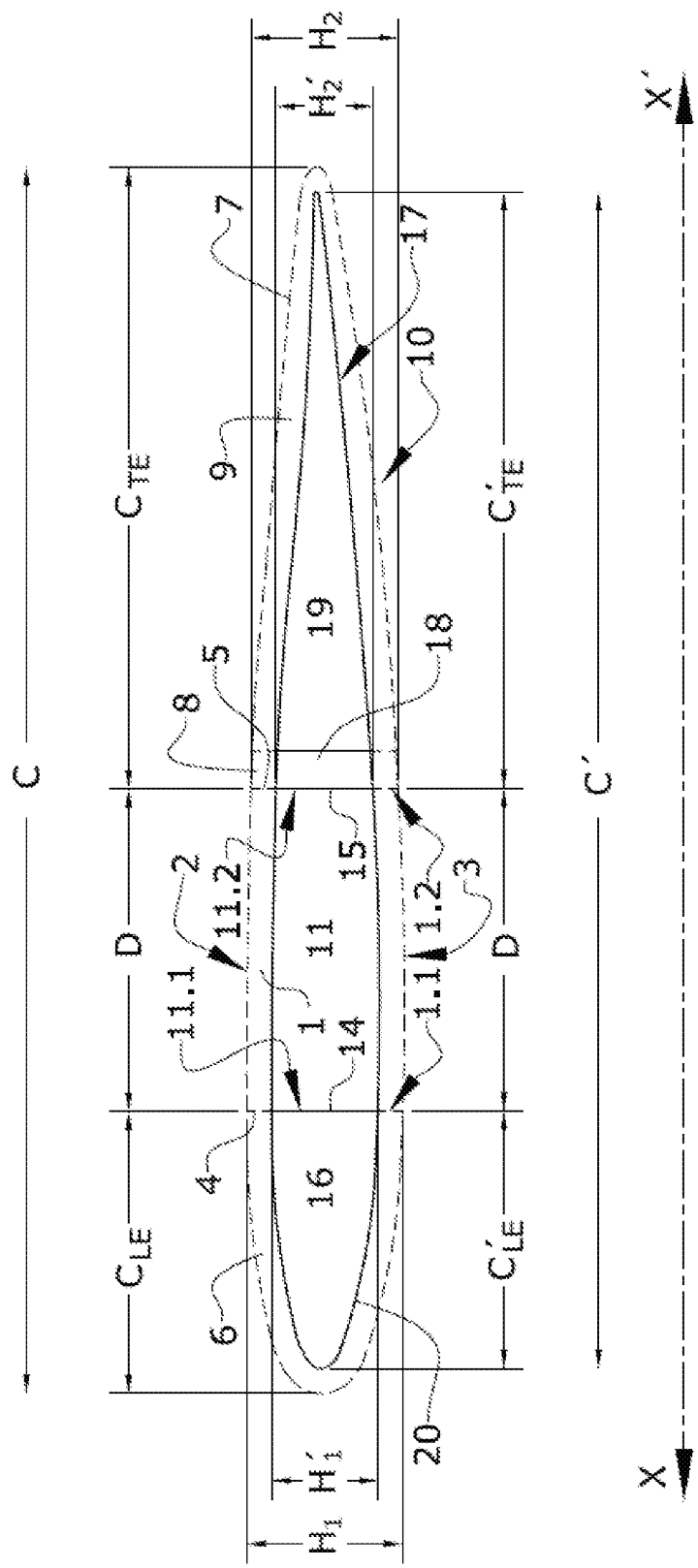
FIG. 4 shows a cross section view, along line A-A of FIG. 1, of a modular lifting surface according to an embodiment of the present invention.

FIGS. 3 and 4 shows a modular lifting surface (10) (dashed lines) obtained by the present method from a standard lifting surface (20) (solid lines) wherein such lifting surfaces (10, 20) are horizontal tail stabilizers. Each modular lifting surface (10) and standard lifting surface (20) comprises a central support structure (1, 11) respectively, wherein such central support structures (1, 11) are torsion boxes.

Figure 5:
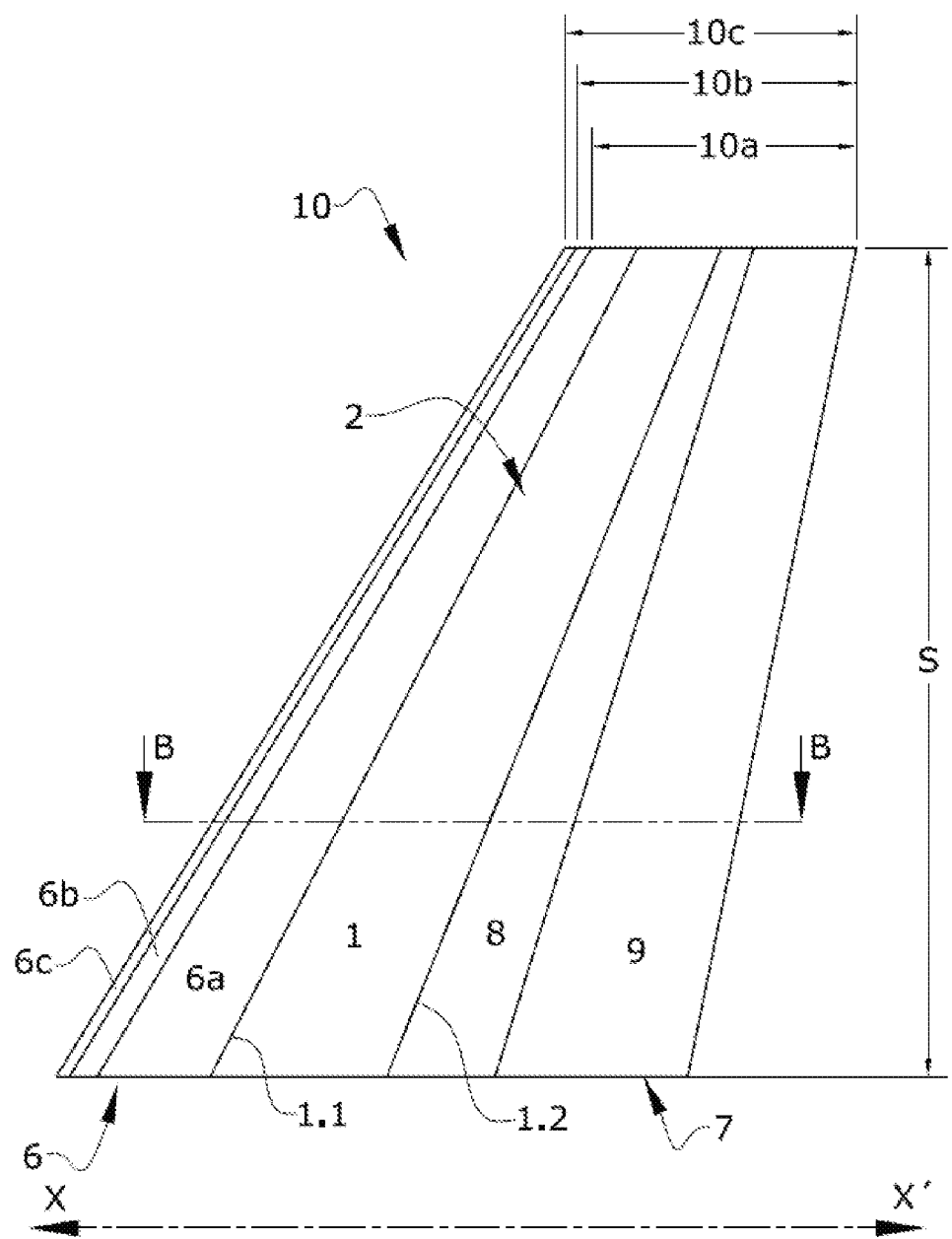
FIG. 5 shows a schematic top view of a modular lifting surface according to another embodiment of the present invention.
Figure 7:
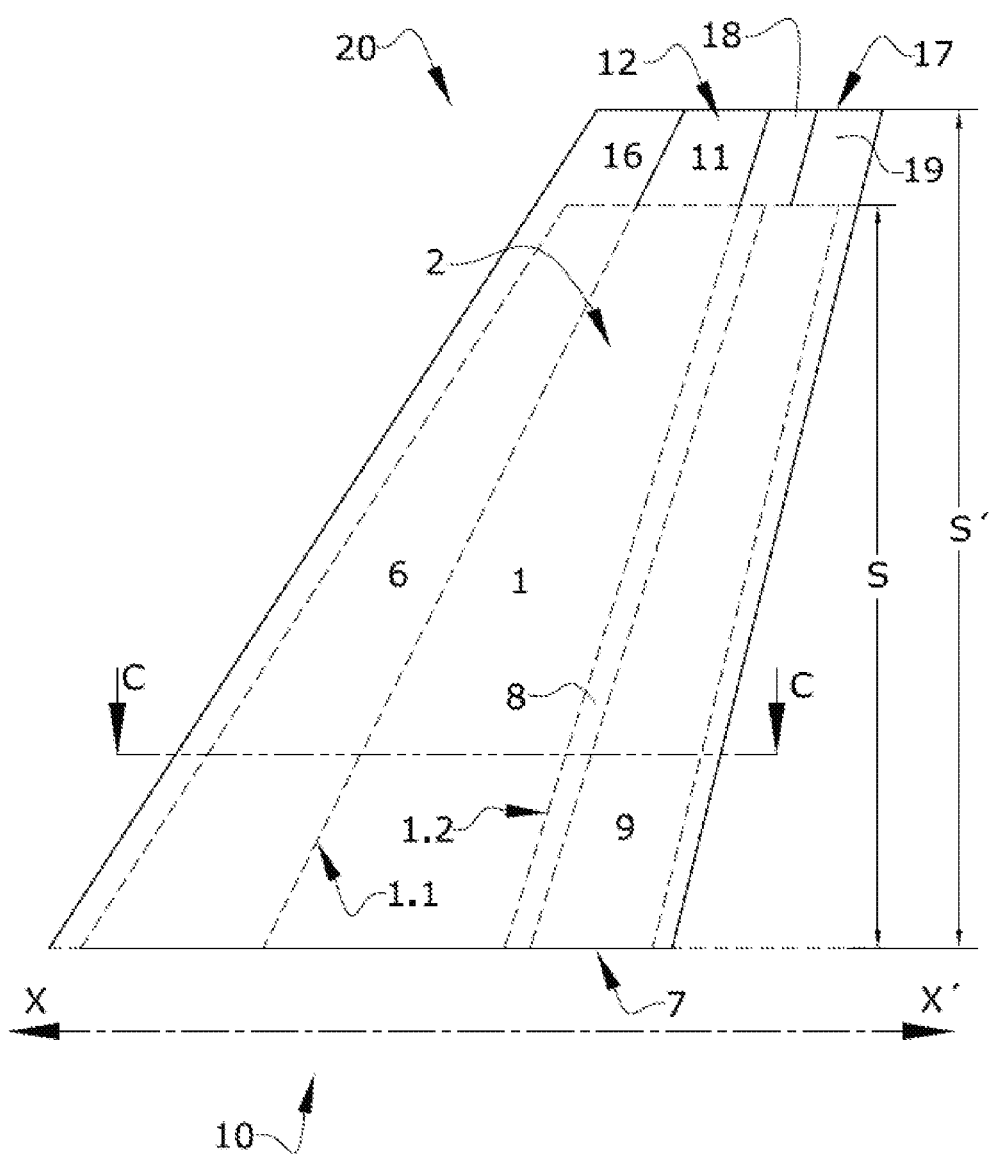
FIG. 7 shows a schematic top view of a modular lifting surface according to another embodiment of the present invention.

FIGS. 3, 5 and 7 shows a longitudinal direction X-X' which is parallel to the flight direction and to the longitudinal axis of an aircraft. In said figures, any cross section is substantially parallel to the longitudinal axis of the aircraft.

FIG. 3 shows a schematic top view of a modular lifting surface (10) (represented by dashed lines and solid lines) compared with a standard lifting surface (20) (represented by solid lines), in such a way that both lifting surfaces (10, 20) comprises a central support structure (1, 11) with the same chord lengths for each said central support structure (1, 11) according to a cross section A-A.

FIG. 3 shows the modular lifting surface (10) with a span length S that is greater than the standard span length S' of the standard lifting surface (20).

The modular lifting surface (10) shown in FIG. 3 comprises a central support structure (1) that it is delimited by two ends, a first end (1.1) and a second end (1.2), and also by two skins, a upper skin (2) and a lower skin (3) (shown in FIG. 4) respectively. In this particular FIG. 3, only the upper skin (2) is shown. Such modular lifting surface (10) further comprises a leading edge (6) and a trailing edge (7). The leading edge (6) is assembled to the central support structure (1) in the first end (1.1); while the trailing edge (7) is assembled to the central support structure (1) in the second end (1.2). In addition, the trailing edge (7) comprises a trailing edge structure (8) and a control surface (9).

Furthermore, FIG. 3 shows a standard lifting surface (20) comprising a standard central support structure (11) that it is delimited by a first standard end (11.1) and a second standard end (11.2), and also by standard upper and lower skins (12, 13) (shown in FIG. 2) respectively. In this particular FIG. 3, only the standard upper skin (12) is shown. Such standard lifting surface (20) further comprises a standard leading edge (16) and a standard trailing edge (17). The standard leading edge (16) being assembled to the central support structure (11) in the first standard end (11.1); while the standard trailing edge (17) is assembled to the standard central structure (11) in the second standard end (11.2). In addition, the standard trailing edge (17) comprises a trailing edge structure (18) and a standard control surface (19).

FIG. 4 shows a transversal cross section along line A-A of FIG. 3 wherein said cross section A-A is parallel to the longitudinal direction X-X'. This FIG. 4 shows a modular lifting surface (10) (represented by dashed lines) compared with a standard lifting surface (20) (represented by solid lines), in such a way that both lifting surfaces (10, 20)

comprise a central support structure (1, 11) with upper (2, 12) and lower (3, 13) skins that comprises the same chord dimensions D respectively.

According to said transversal cross section A-A, the modular lifting surface (10) further comprises, a first spar (4) being located in the first end (1.1) and between the upper and lower skin (2, 3) of the central support structure (1) respectively, and also a second spar (5) being located in the second end (1.2) and between the upper and lower skin (2, 3) of the central support structure (1) respectively. Additionally, the standard lifting surface (20) comprises, a standard first spar (14) being located in the first standard end (11.1) and between the standard upper and lower skins (12, 13) of the standard central support structure (11) respectively, and also a second standard spar (15) being located in the second standard end (11.2) and between such standard upper and lower skin (12, 13) of the standard central support structure (11) respectively.

Furthermore, FIG. 4 shows the chord length of each leading edge (6, 16) and each trailing edge (7, 17) of the lifting surface (10, 20) respectively. The leading edge (6) of the modular lifting surface (10) comprises a chord length $C_{LE}$ greater than the standard chord length $C'_{LE}$ of the standard leading edge (16) of the standard lifting surface (20). The trailing edge (7) of the modular lifting surface (10) comprises a chord length $C_{TE}$ greater than the standard chord length $C'_{TE}$ of the standard trailing edge (17) of the standard lifting surface (20). The FIG. 4 also shows that the modular lifting surface (10) comprises a total chord length C greater than the total standard chord length C' of the standard lifting surface (20). In addition, the trailing edge (7) of the modular lifting surface (10) comprises a trailing edge structure (8) and a control surface (9); the standard trailing edge (17) of the standard lifting surface (20) comprises a trailing edge structure (18) and a standard control surface (19).

FIGS. 3 and 4 shows a particular example of the present invention wherein a horizontal tail stabilizer (10) is designed from a standard horizontal tail stabilizer (20) in such a way that the upper (2) and lower (3) skin of the torsion box (1) of the horizontal tail stabilizer (10), according to the transversal section A-A, comprises the same chord length D of the standard upper (12) and lower (13) skin of the standard torsion box (11) of such standard horizontal tail stabilizer (20).

FIG. 4 further shows that the first spar (4) of the modular lifting surface (10) has a height $H_1$ which is greater than the height $H'_1$ of the first standard spar (14) of the standard lifting surface (20). Additionally, the second spar (5) of the modular lifting surface (10) has a height $H_2$ which is greater than the height $H'_2$ of the second standard spar (15) of the standard lifting surface (20).

Figure 6:
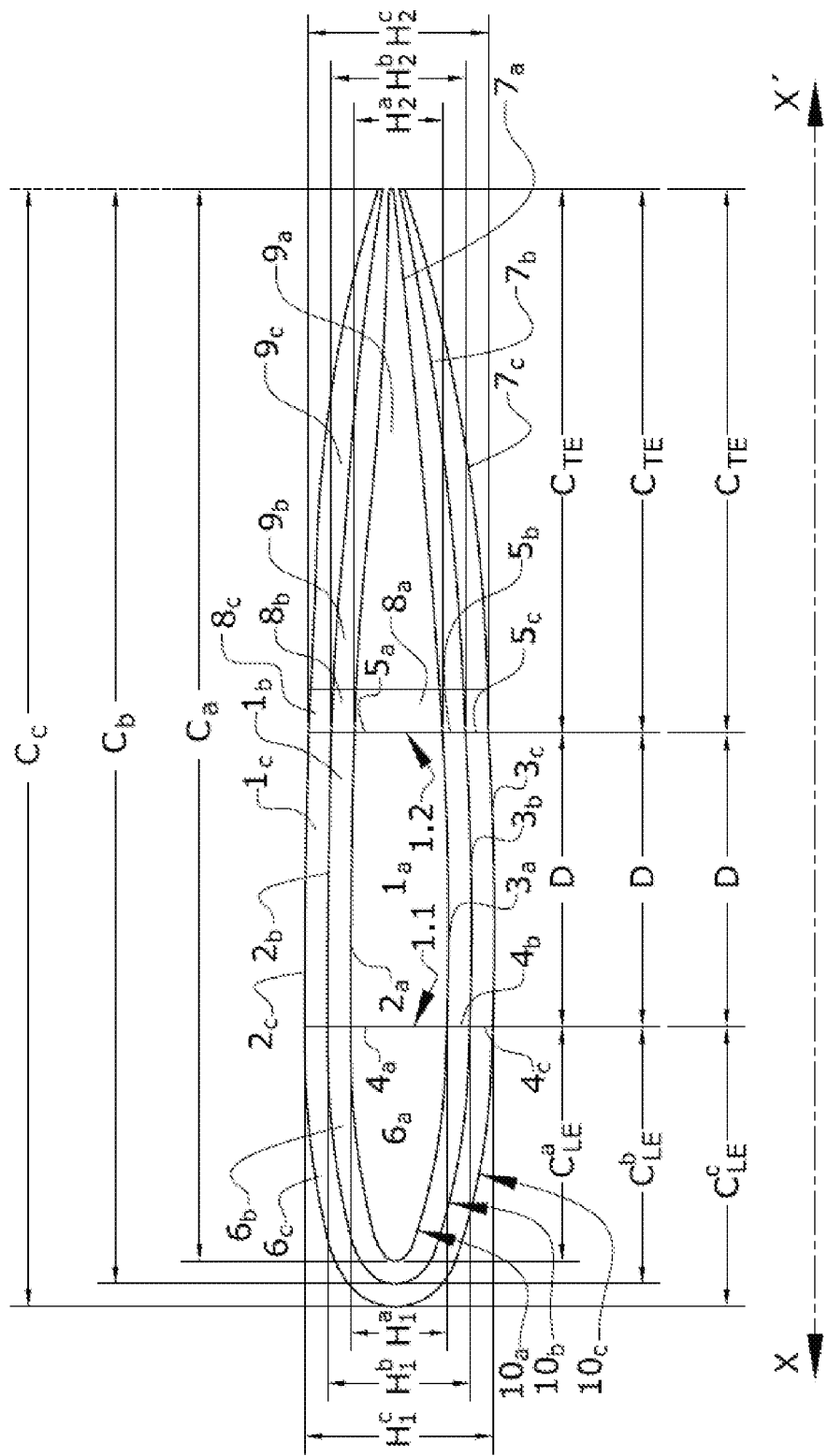
FIG. 6 shows a cross section view of modular lifting surfaces of different sizes according to an embodiment of the present invention.

FIGS. 5 and 6 shows modular lifting surfaces (10a, 10b, 10c) obtained by the present method and designed from a standard lifting surface (20) (not shown). In these FIGS. 5 and 6 the modular lifting surfaces (10, 10a, 10b, 10c) are horizontal tail stabilizer comprising central support structures (1, 1a, 1b, 1c) respectively, wherein such central support structures (1, 1a, 1 b, 1c) are torsion boxes.

FIGS. 5 and 6 allow seeing modular lifting surfaces (10: 10a, 10b, 10c) compared among them wherein each modular lifting surface (10: 10a, 10b, 10c) comprises a central support structure (1: 1a, 1b, 1c) respectively. Such central support structures (1: 1a, 1b, 1c) comprises upper (2: 2a, 2b, 2c) and lower (3:3a, 3b, 3c) skins which according to any transversal section of the modular lifting surface (10) comprises the same chord length D. Additionally, each modular lifting surface (10: 10a, 10b, 10c) comprises a trailing edge (7: 7a, 7b, 7c), according to any transversal section of the modular lifting surface (10), comprising the same chord length $C_{TE}$ each of them.

In FIG. 5 it can also be seen a schematic top view of a modular lifting surface (10: 10a, 10b, 10c) wherein all of each modular lifting surface (10: 10a, 10b, 10c) comprises the same span length S. Given that all the modular lifting surfaces (10: 10a, 10b, 10c) comprise the same central support structure (1: 1a, 1b, 1c), the same trailing edge (7: 7a, 7b, 7c) and also the same span length S, however the leading edge (6: 6a, 6b, 6c) of each modular lifting surface (10: 10a, 10b, 10c) respectively, according to any transversal section of the modular lifting surface (10), comprises a chord length $C_{LE}$ which is different for each leading edge (6: 6a, 6b, 6c) (shown in FIG. 4). The trailing edge (7: 7a, 7b, 7c) of the modular lifting surfaces (10: 10a, 10b, 10c) respectively comprises a trailing edge structure (8: 8a, 8b, 8c) and a control surface (9: 9a, 9b, 9c).

The first modular lifting surface (10a) shown in FIG. 5 comprises a first central support structure (1a). FIGS. 5 and 6 shows that the first modular lifting surface (10a) is delimited by two ends, a first end (1.1) and a second end (1.2) and also by two skins (FIG. 6), a first upper skin (2a) and a first lower skin (3a) respectively. Said first modular lifting surface (10a) further comprises a first leading edge (6a) and a first trailing edge (7a). The first leading edge (6a) is assembled to the first central support structure (1a) in the first end (1.1); while the first trailing edge (7a) is assembled to the first central support structure (1a) in the second end (1.2). The first trailing edge (7a) comprises a first trailing edge structure (8a) and a first control surface (9a).

FIG. 5 also shows a schematic top view of a second modular lifting surface (10b) comprising a second central support structure (1b). FIGS. 5 and 6 shows that the second modular lifting surface (10b) is delimited by two ends, a first end (1.1) and a second end (1.2) and also by two skins, a second upper skin (2b) and a second lower skin (3b) respectively. Said second modular lifting surface (10b) further comprises a second leading edge (6b) and a second trailing edge (7b). The second leading edge (6b) is assembled to the second central support structure (1b) in the first end (1.1), while the second trailing edge (7b) is assembled to the second central support structure (1b) in the second end (1.2). The second trailing edge (7b) comprises a second trailing edge structure (8b) and a second control surface (9b).

Lastly, FIG. 5 also shows a schematic top view of a third modular lifting surface (10c) comprising a third central support structure (1c). FIGS. 5 and 6 shows that the third modular lifting surface (10c) is delimited by two ends, a first end (1.1) and a second end (1.2) and also by two skins, a third upper skin (2c) and a third lower skin (3c) respectively. Said third modular lifting surface (10c) further comprises a third leading edge (6c) and a third trailing edge (7c). The third leading edge (6c) is assembled to the third central support structure (1c) in the first end (1.1), while the third trailing edge (7c) is assembled to the third central support structure (1c) in the second end (1.2). the third trailing edge (7c) comprises a third trailing edge structure (8c) and a third control surface (9c).

FIG. 6 shows a transversal cross section along line B-B of FIG. 5 wherein said cross section B-B is parallel to the longitudinal direction X-X'. This FIG. 6 shows the modular lifting surfaces (10a, 10b, 10c) compared among them.

According to said transversal cross section B-B, the first modular lifting surface (10a) further comprises a first spar (4a) being located in the first end (1.1) and between the first upper and lower skin (2a, 3a) of the first central support structure (1a) respectively, and also a second spar (5a) being located in the second end (1.2) and between the first upper and lower skin (2a, 3a) of the first central support structure (1a) respectively.

According to said transversal cross section B-B, the second modular lifting surface (10b) further comprises a first spar (4b) being located in the first end (1.1) and between the second upper and lower skin (2b, 3b) of the second central support structure (1b) respectively, and also a second spar (5b) being located in the second end (1.2) and between the second upper and lower skin (2b, 3b) of the second central support structure (1b) respectively.

According to the same transversal cross section B-B, the third modular lifting surface (10c) further comprises a first spar (4c) being located in the first end (1.1) and between the third upper and lower skin (2c, 3c) of the third central support structure (1c) respectively, and also a second spar (5c) being located in the second end (1.2) and between the third upper and lower skin (2c, 3c) of the third central support structure (1c) respectively.

Furthermore, FIG. 6 shows that the first leading edge (6a) comprises a first chord length $C_{LE}^a$ that is smaller than the second and third chord length $C_{LE}^b$, $C_{LE}^c$ of the second and third leading edge (6b, 6c) respectively, and the third chord length $C_{LE}^c$ of the third leading edge (6c) is greater than the second chord length $C_{LE}^b$ of the second leading edge (6b). In addition, it is shown that the trailing edges (7a, 7b, 7c) comprises the same chord length $C_{TE}$.

FIG. 6 further shows that the height $H_1^a$ of the first spar (4a) of the first central support structure (1a) is smaller than the height $H_1^b$, $H_1^c$ of the first spars (4b, 4c) of each second and third central support structure (1b, 1c) respectively, and the height $H_1^c$ of the first spar (4c) of the third central support structure (1c) is greater than the height $H_1^b$ of the first spar (4b) of the second central support structure (1b).

Additionally, FIG. 6 further shows that the height $H_2^a$ of the second spar (5a) of the first central support structure (1a) is smaller than the height $H_2^b$, $H_2^c$ of the second spars (5b, 5c) of each second and third central support structure (1b, 1c) respectively, and the height $H_2^c$ of the second spar (5c) of the third central support structure (1c) is greater than the height $H_2^b$ of the second spar (5b) of the second central support structure (1b).

In a particular example of a modular lifting surface (10) the height $H_1$ of the first spar (4), according to a transversal section of the modular lifting surface (10), is equal to the height $H_2$ of the second spar (5). In another particular example of a modular lifting surface (10) the height $H_1$ of the first spar (4), according to a transversal section of the modular lifting surface (10), is greater than the height $H_2$ of the second spar (5).

FIG. 6 also shows that the first modular lifting surface (10a) comprises a total chord length $C_a$ smaller than the total chord lengths $C_b$, $C_c$ of the second and third modular lifting surface (10b, 10c) respectively. The total chord length $C_c$ of the third modular lifting surface (10c) is greater than the total chord length $C_b$ of the second modular lifting surface (10b).

FIGS. 5 and 6 shows a particular example of the present invention that brings the possibility of perform multiple modular lifting surfaces (10) only with the need of sizing the leading edge (6) of said modular lifting surfaces (10), and also only modifying the height of each spar (4, 5) of the central support structure (1).

Figure 8:
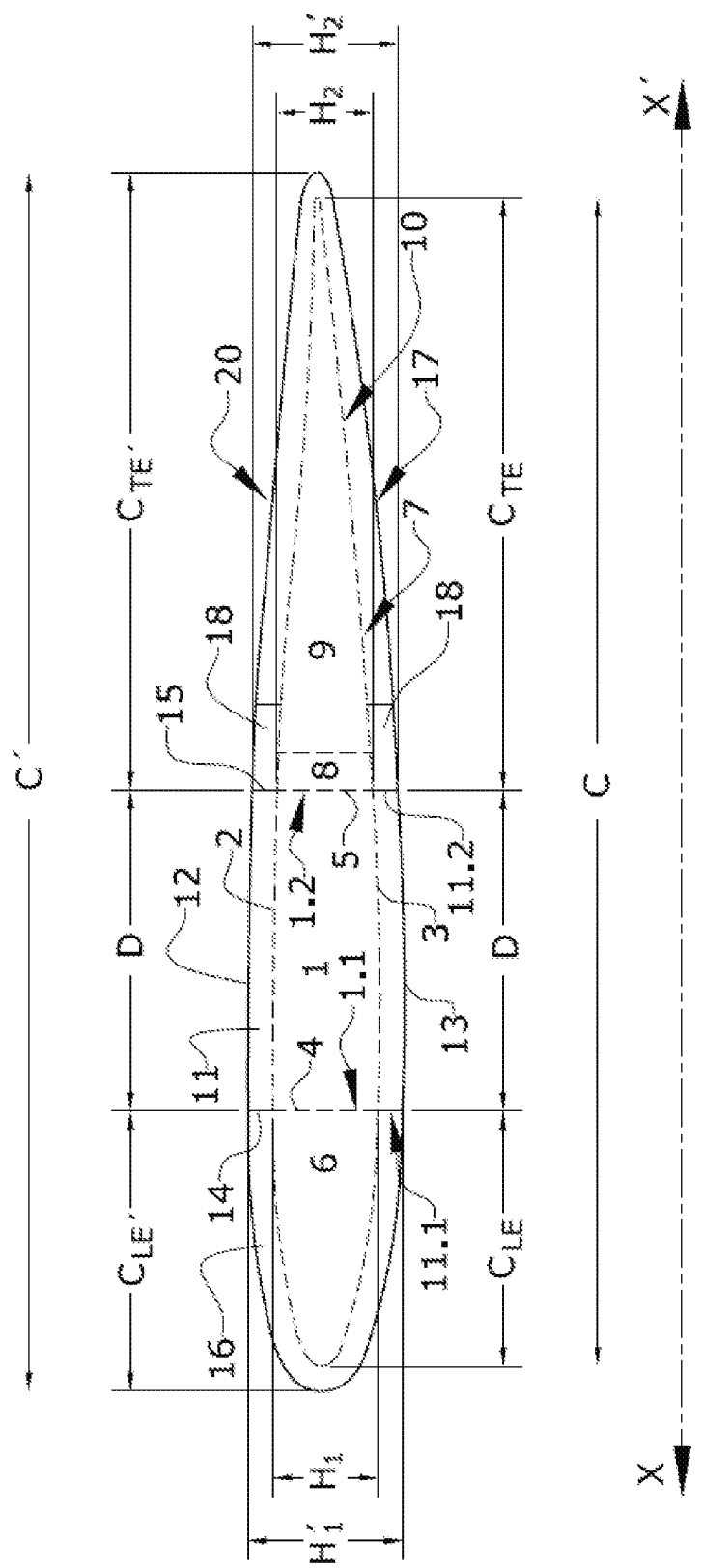
FIG. 8 shows a cross section view of a modular lifting surface according to another embodiment of the present invention.

FIGS. 7 and 8 show a modular lifting surface (10) (dashed lines) obtained by the present method from a standard lifting surface (20) (solid lines) wherein such lifting surfaces (10, 20) are horizontal tail stabilizers. The modular lifting surface (10) corresponds to a lifting surface smaller than the standard lifting surface (20). The modular lifting surface (10) and the standard lifting surface (20) respectively comprises a central support structure (1, 11) which are torsion boxes.

FIG. 7 shows a schematic top view of a modular lifting surface (10) (represented by dashed lines and solid lines) compared with a standard lifting surface (20) (represented by solid lines), in such a way that both lifting surfaces (10, 20) comprises a central support structure (1, 11) with the same chord lengths according to a cross section (C-C). In this FIG. 7 it is shown that the modular lifting surface (10) comprises a span length S that is smaller than the standard span length S' of the standard lifting surface (20).

FIG. 8 shows a transversal cross section along the line C-C of FIG. 7 wherein said cross section C-C is parallel to the longitudinal direction X-X'. Thus FIG. 8 shows a modular lifting surface (10) (represented by dashed lines) compared with a standard lifting surface (20) (represented by solid lines), in such a way that both lifting surfaces (10, 20) comprises a central support structure (1, 11) with upper (2, 12) and lower (3, 13) skins that comprises the same chord dimensions D respectively.

According to said transversal cross section C-C, the modular lifting surface (10) further comprises, a first spar (4) being located in the first end (1.1) and between the upper and lower skin (2, 3) of the central support structure (1) respectively, and also a second spar (5) being located in the second end (1.2) and between the upper and lower skin (2, 3) of the central support structure (1) respectively. Additionally, the standard lifting surface (20) comprises, a standard first spar (14) being located in the first standard end (11.1) and between the standard upper and lower skins (12, 13) of the standard central support structure (11) respectively, and also a second standard spar (15) being located in the second standard end (11.2) and between such standard upper and lower skin (12, 13) of the standard central support structure (11) respectively.

Furthermore, FIG. 8 shows the chord length ($C_{LE}$, $C'_{LE}$) of each leading edge (6, 16) and the chord length ($C_{TE}$, $C'_{TE}$) of each trailing edge (7, 17) of the lifting surface (10, 20) respectively. The leading edge (6) of the modular lifting surface (10) comprises a chord length $C_{LE}$ smaller than the standard chord length $C'_{LE}$ of the standard leading edge (16) of the standard lifting surface (20). The trailing edge (7) of the modular lifting surface (10) comprises a chord length $C_{TE}$ smaller than the standard chord length $C'_{TE}$ of the standard trailing edge (17) of the standard lifting surface (20).

FIG. 8 also shows that the modular lifting surface (10) comprises a total chord length C smaller than the total standard chord length C' of the standard lifting surface (20). In addition, the trailing edge (7) of the modular lifting surface (10) comprises a trailing edge structure (8) and a control surface (9); the standard trailing edge (17) of the standard lifting surface (20) comprises a trailing edge structure (18) and a standard control surface (19). As it can be observed in FIGS. 7 and 8, the chord length of the control surface (9) of the modular lifting surface is smaller than the chord length of the standard control surface (19) of the standard lifting surface (20). In addition, the chord length of the trailing edge structure (8) is smaller than the chord length of the standard trailing edge structure (18) of the standard lifting surface (20).

FIGS. 7 and 8 shows a particular example of the present invention wherein a horizontal tail stabilizer (10) is designed from a standard horizontal tail stabilizer (20) moving vertically the upper (12) and lower (13) standard skins of the standard torsion box (11) and reducing the height of the standard spars (14, 15). Thus, according to the transversal section C-C, the horizontal tail stabilizer (10) comprises the same chord length D of the standard upper (12) and lower (13) skin of the standard torsion box (11) of such standard horizontal tail stabilizer (20).

Figure 9:
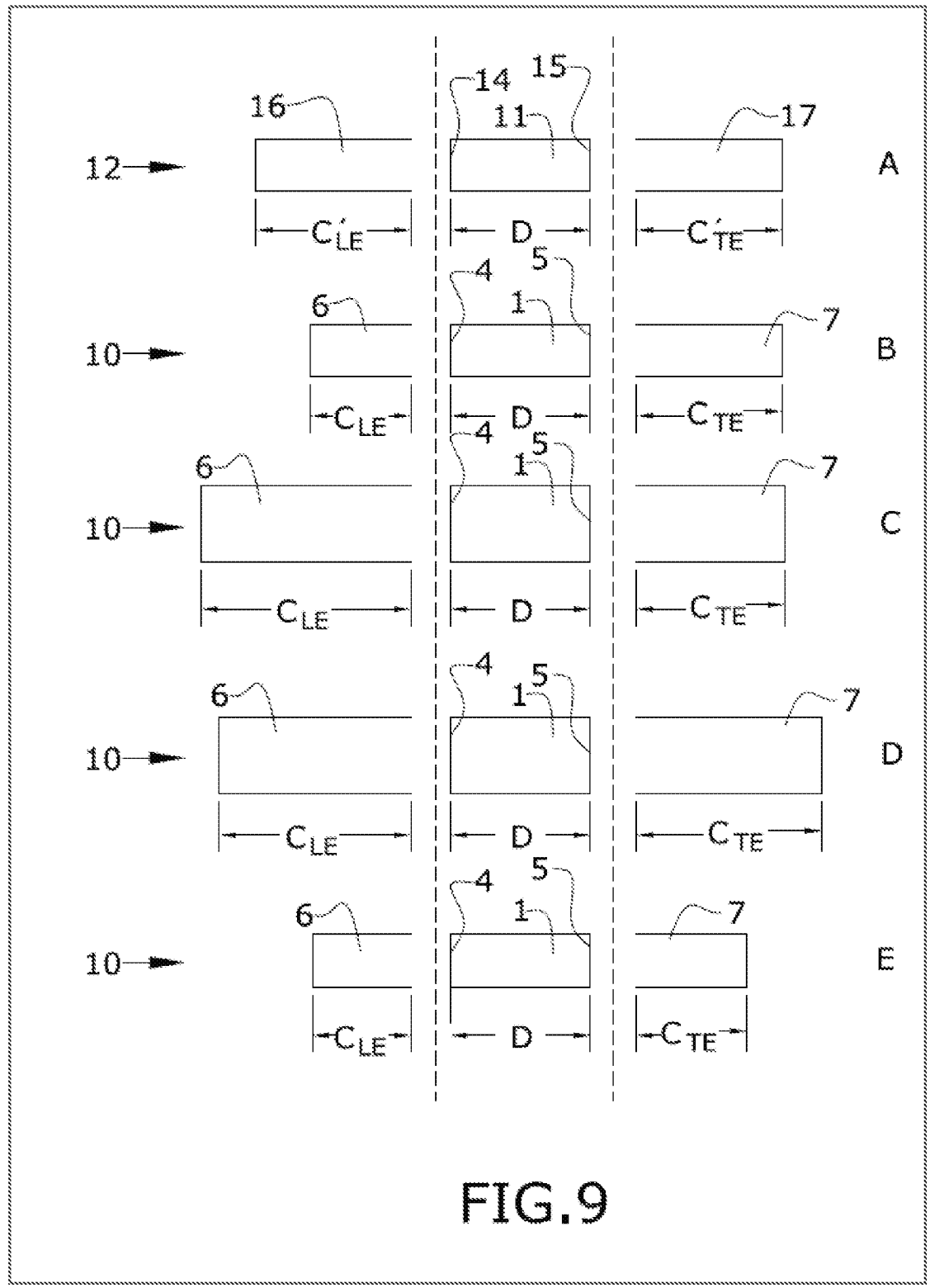
FIG. 9 shows schematic cross section views of an exploited modular lifting surface according to different embodiments A, B, C, D and E of the present invention.

FIG. 9 shows a schematic transversal section of an exploited lifting surface for different examples (shows in sections A, B, C, D and E) according to embodiments of the present invention.

Section A of FIG. 9 shows schematically a transversal section of an exploited standard lifting surface (20) comprising a standard leading edge (16), a standard central support structure (11) and a standard trailing edge (17). The standard leading edge (16) comprises a standard chord length $C'_{LE}$, the standard central support structure (11) comprises a standard chord length D, and the standard trailing edge (17) comprises a standard chord length $C'_{TE}$. Furthermore, the standard central support structure (11) comprises a first standard spar (14) with a standard height $H'_1$, and a second standard spar (15) with a standard height $H'_2$.

Section B of FIG. 9 shows a transversal section of an exploited modular lifting surface (10) compared with the standard lifting surface (20) shown in the section A. The modular lifting surface (10) comprises a leading edge (6), a central support structure (1) and a trailing edge (7). The leading edge (6) comprises a chord length $C_{LE}$ that is smaller than the standard chord length $C'_{LE}$ of the standard leading edge (16). The central support structure (1) comprises a chord length D which is equal to chord length of the standard central support structure (11). The trailing edge (7) comprises a chord length $C_{TE}$ that is equal to the standard chord length $C'_{TE}$ of the standard trailing edge (17). Furthermore, the central support structure (1) comprises a first spar (4) with a height $H_1$ that is equal to the standard height $H'_1$ of the first standard spar (14).

Section C of FIG. 9 shows a transversal section of an exploited modular lifting surface (10) compared with the standard lifting surface (20) shown in the section A. The modular lifting surface (10) comprises a leading edge (6), a central support structure (1) and a trailing edge (7). The leading edge (6) comprises a chord length $C_{LE}$ that is greater than the standard chord length $C'_{LE}$ of the standard leading edge (16). The central support structure (1) comprises a chord length D which is equal to chord length of the standard central support structure (11). The trailing edge (7) comprises a chord length $C_{TE}$ that is equal to the standard chord length $C'_{TE}$ of the standard trailing edge (17). Furthermore, the central support structure (1) comprises a first spar (4) with a height $H_1$ that is greater than the standard height $H'_1$ of the first standard spar (14).

Section D of FIG. 9 shows a transversal section of an exploited modular lifting surface (10) compared with the standard lifting surface (20) shown in the section A. The modular lifting surface (10) comprises a leading edge (6), a central support structure (1) and a trailing edge (7). The leading edge (6) comprises a chord length $C_{LE}$ that is greater than the standard chord length $C'_{LE}$ of the standard leading edge (16). The central support structure (1) comprises a chord length D which is equal to chord length of the standard central support structure (11). The trailing edge (7) comprises a chord length $C_{TE}$ that is greater than the standard chord length $C'_{TE}$ of the standard trailing edge (17). Furthermore, the central support structure (1) comprises a first spar (4) with a height $H_1$ that is greater than the standard height $H'_1$ of the first standard spar (14).

Finally, section E of FIG. 9 shows a transversal section of an exploited modular lifting surface (10) compared with the standard lifting surface (20) shown in the section A. The modular lifting surface (10) comprises a leading edge (6), a central support structure (1) and a trailing edge (7). The leading edge (6) comprises a chord length $C_{LE}$ that is smaller than the standard chord length $C'_{LE}$ of the standard leading edge (16). The central support structure (1) comprises a chord length D which is equal to chord length of the standard central support structure (11). The trailing edge (7) comprises a chord length $C_{TE}$ that is smaller than the standard chord length $C'_{TE}$ of the standard trailing edge (17). Furthermore, the central support structure (1) comprises a first spar (4) with a height $H_1$ that is smaller than the standard height $H'_1$ of the first standard spar (14).

As it can be observed in FIG. 9, multiple dimensions of lifting surface can be performed maintaining the same chord lengths D of the central support structure for any lifting surface.

In a particular example (not shown in figures), according to a cross section of any of the lifting surfaces (10, 20), the a trailing edge (7) of the modular lifting surface (10) is provided with a chord length $C_{TE}$ equal to a standard chord length $C'_{TE}$ of a trailing edge (17) of the standard lifting surface (20); the first spar (4) of such modular lifting surface (10) is provided with a height $H_1$ equal to the standard height $H'_1$ of the standard first spar (14) of the standard lifting surface (20); and the leading edge (6) is provided with a chord length $C_{LE}$ smaller or greater than a chord length $C'_{LE}$ of the leading edge (16) of the standard lifting surface (20).

In another particular example (not shown in figures), according to a cross section of any lifting surfaces (10, 20) the trailing edge (7) of the modular lifting surface (10) is provided with a chord length $C_{TE}$ greater than a standard chord length $C'_{TE}$ of a trailing edge (17) of the standard lifting surface (20); the first spar (4) of such modular lifting surface (10) is provided with a height $H_1$ equal to the standard height $H'_1$ of the standard first spar (14) of the standard lifting surface (20); and the leading edge (6) is provided with a chord length $C_{LE}$ smaller or greater than a chord length $C'_{LE}$ of the leading edge (16) of the standard lifting surface (20).

Figure 10:
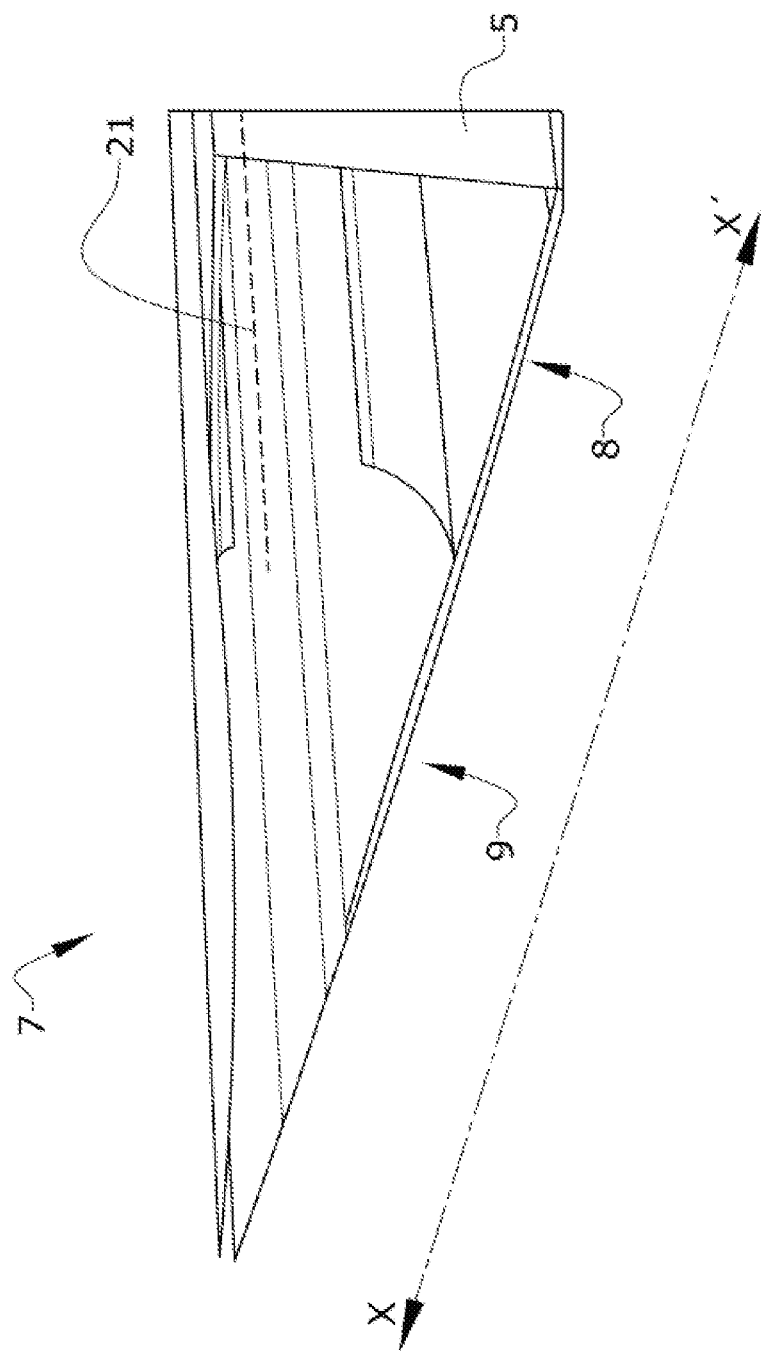
FIG. 10 shows a perspective view of a control surface according to an embodiment of the present invention.

FIG. 10 shows a perspective view of a trailing edge (7) extended along the longitudinal direction X-X', the trailing edge (7) comprising a trailing edge structure (8) and a control surface (9). The control surface (9) comprises a hinge line (21) arranged along the control surface (9) according to the span length of the trailing edge (7).

Figure 11:
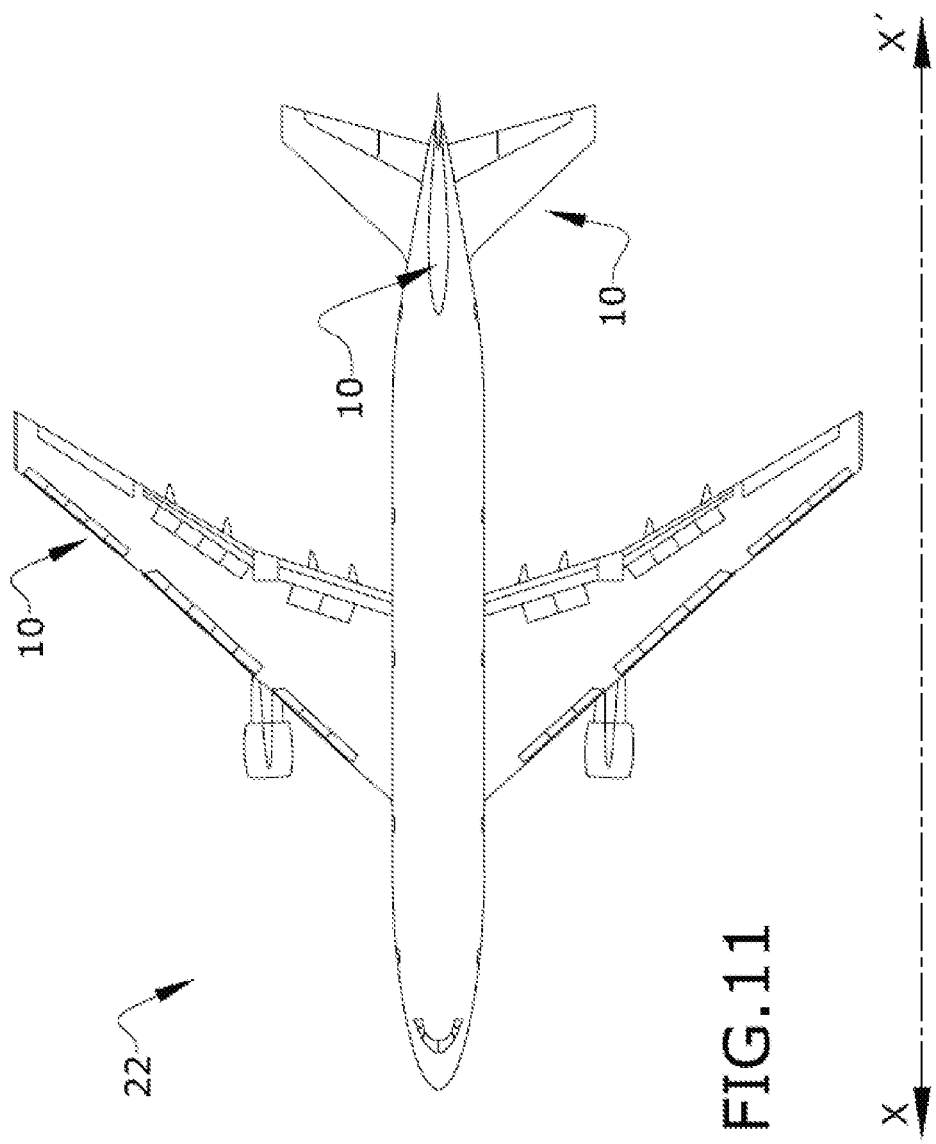
FIG. 11 shows an aircraft according to an embodiment of the present invention.

FIG. 11 shows an aircraft (22) comprising a wing, a horizontal stabilizer (horizontal tail plane) and a vertical stabilizer (fin) which correspond to modular lifting surfaces (10) according to the present invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assembling any size modular lifting surface in a family of aircraft, comprising:
   a) providing a kit of modular lifting surface comprising a first lifting surface, a central support structure, an upper skin, a lower skin, and at least a first spar, wherein the first lifting surface, the upper skin, the lower skin, and the at least first spar have dimensions that are previously defined, wherein the central support structure has a chord length which is the same as a corresponding chord length for all of the central support structures for any size modular lifting surface in the family of aircraft;
   b) providing an upper skin corresponding to an upper skin suitable for the all of the various sizes of the first lifting surface, and providing a lower skin corresponding to a lower skin suitable for the all of the various sizes for the first lifting surface, wherein, across a cross section of the modular lifting surface, the upper skin has a first cord length and the lower skin has a first cord length;
   c) dimensioning and providing a first spar which conforms, at least in part, to a first spar design of the first lifting surface by modifying or keeping the dimensions of a first height of the first spar;
   d) attaching the first spar to both the upper and lower skin to locate the first spar between the upper and lower skins,
   e) dimensioning and providing a leading edge and a trailing edge according to the provided central support structure,
   f) attaching the leading edge to the central support structure where the first spar, the upper skin and the lower skin are included in the central support structure, and attaching the trailing edge to the central support structure at a second end of the central support structure, wherein the second end is opposite to the first end, and
   g) forming the modular lifting surface from the assembly of the leading edge, the central support structure and the trailing edge.

2. The method according to claim 1, further comprising:
   h) dimensioning and providing a second spar conforming, at least in part, to a second spar design of the first lifting surface by modifying or keeping the dimension of a second height of the second spar, and
   i) attaching the second spar to both the upper skin and the lower skin so that the second spar is located between the upper and lower skins in the second end of the central support structure.

3. The method according to claim 1, wherein in step e) the trailing edge is dimensioned and provided with a control surface, and the method further comprises including the control surface in the assembly step f) of the central support structure and the trailing edge at the second end of said central support structure.

4. The method according to claim 1, wherein in step e) the trailing edge is dimensioned and provided with a trailing edge structure and a control surface, wherein the control surface is suitable for the all of the various sizes of the standard lifting surface, and the method includes:
   attaching the trailing edge structure to the second end of said central support structure, and
   attaching the control surface to the trailing edge structure.

5. The method according to claim 1, wherein a chord length of the trailing edge is equal to a first chord length of a first trailing edge of the first lifting surface.

6. The method according to claim 1, wherein the trailing edge has a chord length greater than a first chord length of a first trailing edge of the first lifting surface.

7. The method according to claim 1, wherein a maximum height of the first spar equals a maximum height of the first spar of the first lifting surface.

8. The method according to claim 1, wherein a maximum height of the first spar is shorter than a maximum height of a first spar of the first lifting surface.

9. The method according to claim 1, wherein a maximum height of the first spar is greater than a maximum height of a first spar of the first lifting surface.

10. The method according to claim 1, wherein a maximum chord length of the leading edge is shorter than a maximum chord length of a first leading edge of the first lifting surface.

11. The method according to claim 1, wherein the leading edge has a chord length greater than a first chord length of a first leading edge of the first lifting surface.

12. The method according to claim 1, wherein the modular lifting surface has a span length equal to a first span length of the first lifting surface.

13. The method according to claim 1, wherein the modular lifting surface has a span length greater than a first span length of the first lifting surface.

14. The method according to claim 1, wherein the modular lifting surface has a span length shorter than a first span length of the first lifting surface.

* * * * *